United States Patent
Buch et al.

(10) Patent No.: US 6,553,338 B1
(45) Date of Patent: Apr. 22, 2003

(54) TIMING OPTIMIZATION IN PRESENCE OF INTERCONNECT DELAYS

(75) Inventors: Premal V. Buch, Daly City, CA (US); Hamid Savoj, Los Altos, CA (US); Lukas P. P. P. Van Ginneken, San Jose, CA (US)

(73) Assignee: Magma Design Automation, Inc., Cupertino, CA (US)

( * ) Notice: Subject to any disclaimer, the term of this patent is extended or adjusted under 35 U.S.C. 154(b) by 0 days.

(21) Appl. No.: 09/300,557

(22) Filed: Apr. 27, 1999

(51) Int. Cl.$^7$ ............................................. G06F 17/50
(52) U.S. Cl. .......................... 703/14; 703/15; 703/19; 716/6
(58) Field of Search ............... 703/13, 14, 15, 703/19; 716/6

(56) References Cited

U.S. PATENT DOCUMENTS

| | | |
|---|---|---|
| 5,838,580 A | 11/1998 | Srivatsa |
| 6,002,268 A | * 12/1999 | Sasaki et al. .................. 326/41 |
| 6,009,253 A | * 12/1999 | Srivatsa et al. ................. 716/6 |
| 6,117,182 A | * 9/2000 | Alpert et al. ................... 716/8 |

OTHER PUBLICATIONS

Pullela et al. "Post processing of clock trees via wiresizing and buffering for robust design", IEEE transactions on Computer aided design of Integrated circuits and systems Jun. 1996.*

Alpert et al., "Wire segmenting for improved buffer insertion", Design automation Confeerence, Jun. 1997.*

Venkat, K., "Generalized Delay Optimization of Resistive Interconnections through an Extension of Logic Effort," (Proc.) 1993 IEEE Intl Symposium on Circuits and Systems, Chicago, IL, 306 May 1993; pp. 2106–2109.

Dhar, S.; Franklin, M.A.; "Optimum Buffer Circuits for Driving Long Uniform Lines," IEEE Journal of Solid–State Circuits, 1/91, vol. 26, No. 1, pp. 32–40.

Nekili, M.; Savaria, Y., "Optimal Methods of Driving Interconnections in VLSI Circuits," 1992 IEEE Intl Symposium on Circuits and Systems, San Diego, CA, May 10–13 1992, pp. 21–24.

* cited by examiner

*Primary Examiner*—Samuel Broda
*Assistant Examiner*—Kandasamy Thangavelu
(74) *Attorney, Agent, or Firm*—Pillsbury Winthrop LLP

(57) ABSTRACT

A strategy for optimal buffering in the case of an infinitely long wire buffered with an arbitrary number of equally spaced single-size buffers is presented. A simple but efficient technique is proposed using this to choose a buffer size and determine a good inter-buffering distance up front, thus enabling fast, efficient buffer insertion. The analysis also allows representing delays of long wires as a simple function of the length and buffer and wire widths. Based on this, a novel constant wire delay approach is proposed where the proposed wire delay model is used for fairly accurate prediction of wire delays early in the design process and these predictions are later met via buffer insertion and wire sizing.

7 Claims, 2 Drawing Sheets

TIMING OPTIMIZATION IN PRESENCE OF INTERCONNECT DELAYS

BACKGROUND OF THE INVENTION

1. Field of the Invention

The present invention is directed to digital logic design systems. More particularly, the invention is directed to automated digital logic synthesis and placement systems.

2. Background of the Related Art

Prior art computer aided design (CAD) systems for the design of integrated circuits and the like assist in the design thereof by providing a user with a set of software tools running on a digital computer. In the prior art, the process of designing an integrated circuit on a typical CAD system was done in several discrete steps using different software tools.

First, a schematic diagram of the integrated circuit is entered interactively to produce a digital representation of the integrated circuit elements and their interconnections. This representation may initially be in a hardware description language such as Verilog and then translated into a register transfer level (RTL) description in terms of pre-designed functional blocks, such as memories and registers. This may take the form of a data structure called a net list.

Next, a logic compiler receives the net list and, using a component database, puts all of the information necessary for layout, verification and simulation into object files whose formats are optimized specifically for those functions.

Afterwards, a logic verifier checks the schematic for design errors, such as multiple outputs connected together, overloaded signal paths, etc., and generates error indications if any such design problems exist. In many cases, the IC designer improperly connected or improperly placed a physical item within one or more cells. In this case, these errors are flagged to the IC designer so that the layout cells may be fixed so that the layout cells perform their proper logical operation. Also, the verification process checks the hand-laid-out cells to determine if a plurality of design rules have been observed. Design rules are provided to integrated circuit designers to ensure that a part can be manufactured with greater yield. Most design rules include hundreds of parameters and, for example, include pitch between metal lines, spacing between diffusion regions in the substrate, sizes of conductive regions to ensure proper contacting without electrical short circuiting, minimum widths of conductive regions, pad sizes, and the like. If a design rules violation is identified, this violation is flagged to the IC designer so that the IC designer can properly correct the cells so that the cells are in accordance with the design rules.

Then, using a simulator the user of the CAD system prepares a list of vectors representing real input values to be applied to the simulation model of the integrated circuit. This representation is translated into a form which is best suited to simulation. This representation of the integrated circuit is then operated upon by the simulator which produces numerical outputs analogous to the response of a real circuit with the same inputs applied. By viewing the simulation results, the user may then determine if the represented circuit will perform correctly when it is constructed. If not, he or she may re-edit the schematic of the integrated circuit, re-compile and re-simulate. This process is performed iteratively until the user is satisfied that the design of the integrated circuit is correct.

Then, the human IC designer presents as input to a logic synthesis tool a cell library and a behavioral model. The behavioral circuit model is typically a file in memory which looks very similar to a computer program. The behavioral circuit model contains instructions which define logically the operation of the integrated circuit. The logic synthesis tool receives as input the instructions from the behavioral circuit model and the library cells from the library. The synthesis tool maps the instructions from the behavioral circuit model to one or more logic cells from the library to transform the behavioral circuit model to a gate schematic net list of interconnected cells. A gate schematic net list is a data base having interconnected logic cells which perform a logical function in accordance with the behavioral circuit model instructions. Once the gate schematic net list is formed, it is provided to a place and route tool.

The place and route tool is used to access the gate schematic net list and the library cells to position the cells of the gate schematic net list in a two-dimensional format within a surface area of an integrated circuit die perimeter. The output of the place and route step is a two-dimensional physical design file which indicates the layout interconnection and two-dimensional IC physical arrangements of all gates/cells within the gate schematic net list.

Interconnect delay is a major concern in deep sub-micron technologies for two reasons: as the technologies scale, the feature sizes are shrinking. The gate resistance and capacitance scales better with this shrinking than the interconnect resistance and capacitance. Moreover, although the local interconnect lengths are shrinking, lengths of global interconnect and long wires are increasing as chip sizes increase. As the interconnect delay is proportional to the square of the wire length, this has a significant impact on the over-all timing of the chip. Buffer insertion and wire sizing are the two main tools to manage interconnect delay. Among these, buffer insertion offers the possibility of reducing cross talk hazards due to signal regeneration (apart from any cross talk reduction obtained by offsetting inverters).

In the deep sub-micron technologies, the contribution of interconnect delay can constitute as much as 80% of the total delay. Interconnect delay is proportional to the square of the wire length. As a result, long wires are a major concern in designing high performance chips since the long wire lengths increase quadratically with technology scaling. Buffer insertion and wire sizing are the two main tools to manage interconnect delay.

Apart from the wire length, the interconnect delay is a function of various technology parameters, net topology, source and sink parameters etc. The exact formulation of the interconnect delay and an optimal buffering scheme to minimize it can be very complex. Since many of these parameters are dependent on specific net instances, a complex analysis/buffering strategy would have limited practical use when buffering a design with tens of thousands of long wires.

SUMMARY OF THE INVENTION

The present invention has been made with the above problems of the prior art in mind, and a first object of the present invention is to provide a wire delay model which allows accurate prediction of wire delays in the presence of long wires. The delay estimates account for the effect of buffering on the delay. The model is exact under some assumptions and is a good heuristic approximation for more general cases.

It is a further object of the present invention to provide a method which derives the optimal buffering distance and the optimal buffer size in long wires under some assumptions.

These formulae are also good heuristic approximations for more general cases.

It is another object of the present invention to provide a method using delay models which allows placement algorithms to account for the effect of buffering of long wires on delay and capacitance without actually inserting buffers in the design.

It is a still further object of the present invention to provide a method in which design independence of the optimal buffering distance and the optimal buffer size can be used to efficiently buffer long wires. This strategy can also be applied in a placement-optimization flow to implement the delays and capacitances estimated by the proposed delay model during placement.

It is a still further object of the present invention to provide a delay model in which the wire delay is a function of the wire length and wire width and spacing. This formulation can be used to trade-off length versus wire width and/or wire spacing to achieve a target delay.

It is yet another object of the present invention to provide a delay model that can be used to estimate wire delays at any stages in a placement-optimization flow. This delay can then be held constant throughout the rest of the flow by varying wire width and spacing as the wire length changes.

It is a still further object of the present invention to provide a delay model that can be used to implement a desired wire delay by wire width, spacing or length changes to meet a target stage delay (delay of driving gate+wire delay). Given a fixed placement, this can be used to balance fast/slow gate delays in the circuit. This can increase the flexibility of gate sizing algorithms.

It is yet another object of the present invention to provide an algorithm which selects target wire delays in a design. The algorithm can be applied in conjunction with a gate sizing/gate delay selection algorithm to trade-off gate and wire delays and the associated area/routing congestion. These target delays are then met by varying the wire widths and spacing. If no combination of wire delays can satisfy the timing constraints, the circuit cannot meet timing for the given selection of gate sizes. This can be used as a timing checkpoint in a placement flow.

It is another object of the present invention to provide a buffering algorithm which combines optimal buffering distance results with previous works on buffer insertion using dynamic programming.

It is another object of the present invention to provide a method in which constant wire delay placement-optimization flow uses the above results and algorithms to hold wire delay constant.

It is another object of the present invention to provide a technique in which the delay of an optimally buffered wire can be modeled using just library RC parameters for any given wire size and spacing.

It is a still further object of the present invention to provide such a technique in which very large circuit designs can be buffered and sized/spaced efficiently and which allows modeling the effect of buffering without actually inserting buffers in the design.

It is a further object of the present invention to provide a technique in which an increase in wire delay can be made linear in length, as opposed to quadratic for an unoptimized wire, via buffering.

It is yet another object of the present invention to provide a technique in which an increase in wire delay can be made independent of its length, as opposed to the quadratic dependency of an unoptimized wire, via buffering and wire sizing/spacing.

The above objects are achieved according to an aspect of the present invention by providing a strategy for optimal buffering in the case of a long wire buffered with an arbitrary number of equally spaced single-size buffers. A simple but efficient technique is proposed using this to choose a buffer size and determine a good inter-buffering distance up front, thus enabling fast, efficient buffer insertion. The analysis also allows representing delays of long wires as a simple function of the length and buffer and wire widths. Based on this, a novel constant wire delay approach is proposed where the proposed wire delay model is used for fairly accurate prediction of wire delays early in the design process and these predictions are later met via buffer insertion and wire sizing.

The present invention provides a buffering strategy that is optimal in the case of an infinitely long wire buffered with an arbitrary number of equally spaced single-size buffers. In practice, this technique can be used to choose a buffer size and determine a good inter-buffering distance up front, thus enabling fast, efficient buffer insertion.

The delay due to long wires can be represented as a linear function of the length. Based on this, a novel constant wire delay approach can be developed where the proposed wire delay model is used for fairly accurate prediction of wire delays early in the design process and these predictions are later met via buffer insertion and wire sizing.

The present invention initially treats the above problem in the case of an infinitely long wire buffered with an arbitrary number of equally spaced single-size buffers. A simple but efficient technique is proposed using this to choose a buffer size and determine a good inter-buffering distance up front, thus enabling fast, efficient buffer insertion. The analysis presented here also allows representing delays of long wires as a simple function of the length and buffer and wire widths. Based on this, a novel constant wire delay approach is proposed where the proposed wire delay model is used for fairly accurate prediction of wire delays early in the design process and these predictions are later met via buffer insertion and wire sizing.

BRIEF DESCRIPTION OF THE DRAWINGS

These and other objects, features, and advantages of the present invention are better understood by reading the following detailed description of the preferred embodiment, taken in conjunction with the accompanying drawings, in which.

DETAILED DESCRIPTION OF THE PRESENTLY PREFERRED EXEMPLARY EMBODIMENT

Figure 1:
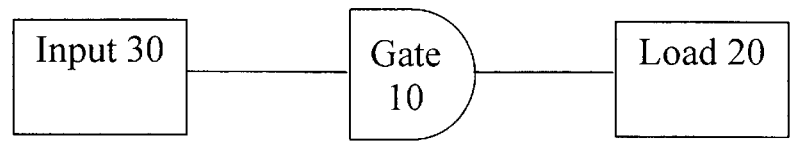
FIG. 1 is a schematic diagram of a gate and its load.

As is known in the art, the theory of logical effort represents the delay $D_{gate}$ through a simple logic gate 10 as shown in FIG. 1, driving a capacitive load 20 as:

$$D_{gate} = \tau(g_{gate} h_{gate} + p_{gate}) \qquad (1)$$

where $g_{gate}$ is the logical effort of the gate, $h_{gate}$ is the electrical effort and $p_{gate}$ is the intrinsic delay of the gate. $\tau$ is a technology constant defined as the delay of an ideal inverter with no intrinsic delay, driving another ideal inverter.

The logical effort $g_{gate}$ represents the computational complexity of the gate and measures how much weaker it is in current drive compared to an ideal inverter with the same input capacitance. It compares the characteristic time constant (product of the output resistance and input capacitance) of a gate with that of an inverter. Logical effort is a function of the topology of the transistor interconnections but not of transistor sizes, and is given by:

$$g_{gate} = \frac{R_{gate\_min} C_{gate\_min}}{R_{inv\_min} C_{inv\_min}} \quad (2)$$

where gate_min refers to the minimum sized gate and inv_min to the minimum sized inverter.

The electrical effort $h_{gate}$ is the ratio of the load capacitance to input capacitance 30 and does depend on the transistor sizes. $h_{gate}$ is given by:

$$h_{gate} = \frac{C_{load}}{C_{in}} \quad (3)$$

where $C_{load}$ is the load capacitance 20 of the gate in the given network, and $C_{in}$ the input capacitance 30.

The parasitic delay $p_{gate}$ occurs primarily due to source/drain diffusion capacitance $C_{diff\_min}$ at the output of the minimum sized gate. It depends on the layout geometry, but is independent of the sizes:

$$p_{gate} = \frac{R_{gate\_min} C_{diff\_min}}{R_{inv\_min} C_{inv\_min}} \quad (4)$$

Figure 2:
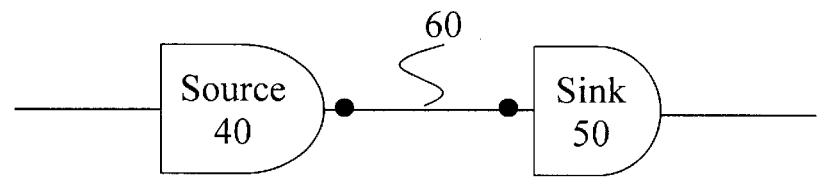
FIG. 2 is a schematic diagram of a gate driven by an input and driving a load.
Figure 3:
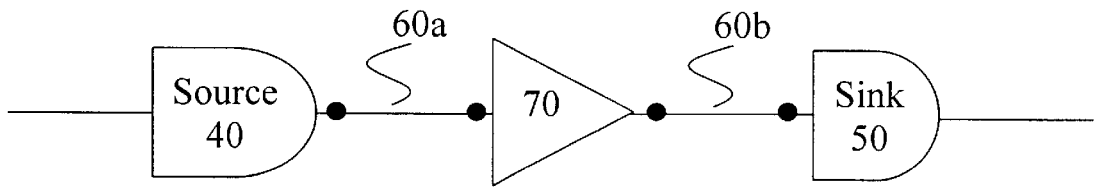
FIG. 3 is a schematic diagram of a buffered 2-pin net.

Now, consider a stage in the circuit with the source gate 40 and sink gate 50 connected by a 2-pin net 60 as shown in FIG. 2. An estimate of the stage delay from the input pin of the source gate 40 to the input pin of the sink gate 50 can be obtained by combining the source gate delay (as given by the theory of logical effort as described above) with wire delay (as computed by the Elmore delay model as is known in the art). Then, if the net 60 is not buffered, the delay $D_0$ is given by:

$$D_0 = \tau\left(g_{so}C_{si} + \frac{C_w L}{C_{so}} + p_{so}\right) + R_w L\left(\frac{C_w L}{2} + C_{si}\right) \quad (5)$$

where L is the length of the net 60, $R_w$ and $C_w$ are the per unit length interconnect resistance and capacitance, $R_{so}$ and $C_{so}$ are the source driver 40 resistance and input capacitance, $C_{si}$ is the sink 50 input capacitance, $g_{so}$ is the logical effort of the source 40, $p_{so}$ is the parasitic delay of the source 40 and τ is the technology constant. Note that the delay due to the source driver 40 resistance charging the sink input 50 capacitance is included in the logical effort delay and is hence omitted from the Elmore delay terms.

In the case when the net has one buffer 70 inserted halfway between the source 40 and the sink 50 as shown in FIG. 7, the delay $D_1$ is given by adding the two stage delays from the source to the buffer and from the buffer to the sink:

$$D_1 = \tau\left(g_{so}C_b + \frac{\frac{C_w L}{2}}{C_{so}} + p_{so}\right) + \frac{R_w L}{2}\left(\frac{C_w L}{4} + C_b\right) + \quad (6)$$

-continued
$$\tau\left(\frac{C_{si} + \frac{C_w L}{2}}{C_b} + p_b\right) + \frac{R_w L}{2}\left(\frac{C_w L}{4} + C_{si}\right)$$

where $R_b$ and $C_b$ are the buffer driver resistance and input capacitance and $p_b$ the intrinsic delay of the buffer 70.

Figure 4:
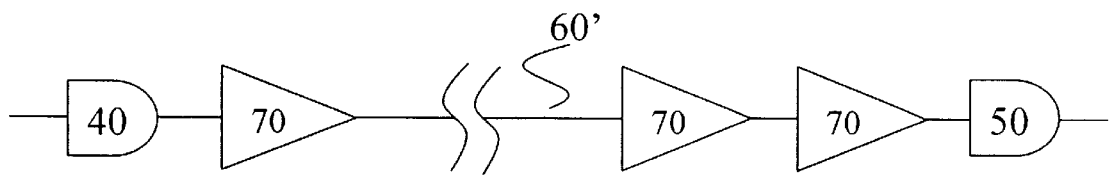
FIG. 4 is a schematic diagram of a buffered long wire.

Similarly, in the case of a net 60 with k equally spaced same-size buffers 70 as shown in FIG. 4, the total stage delay from the source 40 to the sink 50 is given by the sum of k+1 stage delays:

$$D_k = \tau\left(g_{so}C + \frac{\frac{C_w L}{2}}{C_{so}} + p_{so}\right) + R_w L_k\left(\frac{C_w L_k}{2} + C_b\right) + \quad (7)$$

$$\sum_{i=1}^{k-1} \tau\left(1 + \frac{C_w L_k}{C_b} + p_b\right) + R_w L_k\left(\frac{C_w L_k}{2} + C_b\right) +$$

$$R_w L_k\left(\frac{C_w L_k}{2} + C_{si}\right) + \tau\left(1 + \frac{C_w L_k}{C_b} + p_b\right) p_b$$

$$D_k = \tau\left(g_{so}C_b + \frac{C_w L_k}{C_{so}} + p_{so}\right) + \quad (8)$$

$$k\tau\left(1 + \frac{C_w L_k}{C_b} + p_b\right) + \frac{R_w C_w L_k}{2} + kR_w C_b L_k + R_w C_{si} L_k$$

where $L_k = L/(k+1)$ is the distance between buffers 70.

Since the wire delay varies with the square of the wire length, buffer insertion can reduce the wire delay by dividing the delay of one long wire segment in to two or more smaller segments. However, inserting a buffer 70 adds the buffer delay to the over-all stage delay. Thus, there is a trade-off between the number of buffers 70 inserted and the over-all stage delay. Let $w_{opt}$ be the ratio of the widths of an optimally sized buffer for a given stage and the minimum sized buffer and $k_{opt}$ be the optimal number of buffers 70 for a given stage. Clearly, $k_{opt}$ depends on the size of the buffer 70 being inserted since the gate delay of the buffer 70 and wire delays of the segments both depend on $R_b$ and $C_b$.

Now, consider the above 2-pin net 60 with an arbitrary number of equally spaced same-sized buffers 70, where the sink 50 and source 40 are sized such that the sink 50 input capacitance and the source 40 driving resistance are the same as the buffer 70 input capacitance and driving resistance. Let L, $R_0$, $C_0$, τ, $p_b$, $R_w$ and $C_w$ be the parameters defined above. Also, let the number of buffers 70 inserted on the net be k, k=0, 1 . . . , k≧0. Let $R_{so}$, $C_{so}$, $C_{si}$, $g_{so}$ and $p_{so}$ be defined as before. Further, it is given that $R_b = R_{so}$, $C_b = C_{si}$, $g_{so} = 1$.

From Equation (1), $$D_k = \tau\left(g_{so}C_b + \frac{C_w L_k}{C_{so}} + p_{so}\right) + \quad (9)$$

$$k\tau\left(1 + \frac{C_w L_k}{C_b} + p_b\right) + \frac{R_w C_w L_k}{2} + kR_w C_b L_k + R_w C_{si} L_k$$

Rearranging, $$D_k = (k+1)\tau\left(1 + \frac{C_w L_k}{C_b} + p_b\right) + \frac{R_w C_w L_k}{2} + (k+1)R_w C_b L_k \quad (10)$$

$$\Rightarrow D_k = (k+1)\tau\left(1 + \frac{C_w L_k}{C_b} + p_b\right) + \frac{R_w C_w L^2}{2(k+1)} + (R_b C_w + R_w C_b)L$$

-continued $$\Rightarrow \frac{\partial D_k}{\partial k} = \tau(1+p_b) - \frac{R_w C_w L^2}{2(k+1)^2} \text{ and } \frac{\partial^2 D_k}{\partial k^2} = \frac{R_w C_w L^2}{(k+1)^3} > 0$$

$k_{opt}$, the number of buffers 70 for which the delay is minimized is then given by:

$$\frac{\partial D_k}{\partial k} = 0 \Rightarrow k_{opt} = L\sqrt{\frac{R_w C_w}{2\tau(1+p_b)}} - 1 \quad (11)$$

The optimal inter-buffer spacing is given by:

$$L_{kopt} = \sqrt{\frac{2\tau(1+p_b)}{R_w C_w}} \quad (12)$$

The optimal delay is given by:

$$D_k = L\left(\sqrt{2R_w C_w \tau(1+p_b)} + \frac{\tau C_w}{C_b}\right) \quad (13)$$

Since $R_0$ and $C_0$ are the driver resistance and input capacitance of a minimum size buffer, if w is the ratio of the widths of the buffer 70 used here and the minimum size buffer, $R_b = R_0/w$ and $C_b = wC_0$. The delay then is:

$$D_k = L\left(\sqrt{2R_w C_w \tau(1+p_b)} + \frac{\tau C_w}{wC_0} + wR_w C_0\right) \quad (14)$$

$$\Rightarrow \frac{\partial D_k}{\partial w} = R_w - \frac{\tau C_w}{w^2 C_0} \text{ and } \frac{\partial^2 D_k}{\partial w^2} = \frac{\tau C_w}{w^3} > 0$$

The optimal size of the buffer 70 is then given by:

$$\frac{\partial D_k}{\partial w} = 0, w_{opt}\sqrt{\frac{\tau C_w}{R_w C_0^2}} \quad (15)$$

Since $k_{opt}$ is independent of w and $w_{opt}$ is independent of k, the above two-variable analysis is consistent. Thus, the delay from the input of the source 40 to the input of the sink 50 under the logical effort and Elmore delay model is minimized when the number of buffers 70 inserted is $$k_{opt} = L\sqrt{\frac{R_w C_w}{2\tau(1+p_b)}}$$

and each buffer 70 is $$w_{opt} = \sqrt{\frac{\tau C_w}{R_w C_0^2}}$$

times larger than the minimum sized buffer.

Since the above formula for optimal delay applies to $k_{opt} \geq 0$, i.e., $L \geq L_{kopt}$, the wire delay of a 2-pin net 60 with above buffering constraints can be modeled as (from (1), and by substituting Equation (15) in Equation (13)):

$$D_k = \tau\left(1 + \frac{C_w L}{C_b + p_b}\right) + R_b C_w L + R_w C_b L + \frac{R_w C_w L^2}{2} \quad L < L_{kopt} \quad (16)$$

$$D_k = L\sqrt{R_w C_w}\left(\sqrt{2\tau(1+p_b)} + 2C_0\sqrt{\tau}\right) \quad L \geq L_{kopt} \quad (17)$$

From the above derivation, one can see that the delay model in Equations (16) and (17) is exact for 2-pin nets 60 with an arbitrary number of equally spaced same-sized buffers 70 and with the sink 50 and source 40 sized to be the same as the buffer 70 input capacitance and driving resistance. Further, the delay model in Equations (16) and (17) is continuous and differentiable everywhere in L for 2-pin nets 60 with an arbitrary number of equally spaced same-sized buffers 70 and with the sink 50 and source 40 sized to be the same as the buffer 70 input capacitance and driving resistance. This can be seen as follows.

First, $D_k$ is clearly continuous and differentiable everywhere in L except at $L_{kopt}$. For $L = L_{kopt}$, $$\lim_{L \to L_{kopt}^-} D_k = \tau\left(g_{so}\frac{C_b + C_w L}{C_{so}} + p_{so}\right) + \frac{R_w C_w L^2}{2} + R_w C_{si} L \quad (18)$$

For $R_b = R_{so}, C_b = C_{si}, g_{so} = 1$ $$\lim_{L \to L_{kopt}^-} D_k = \tau\left(1 + \frac{C_w L}{C_b} + p_b\right) + \frac{R_w C_w L^2}{2} + R_w C_b L \quad (19)$$

$$= L\left(\frac{\tau(1+p_b)}{L} + \frac{R_w C_w L}{2} + \frac{\tau C_w}{C_b} + R_w C_b\right)$$

$$\Rightarrow \lim_{L \to L_{kopt}^-} D_k = L\left(\sqrt{2R_w C_w \tau(1+p_b)} + \frac{\tau C_w}{C_b} + R_w C_b\right)$$

$$= D_k(L_{kopt}) = \lim_{L \to L_{kopt}^+} D_k$$

$D_k$ is thus continuous at $L = L_{kopt}$.

Also, $$\lim_{L \to L_{kopt}^-} \frac{\partial D_k}{\partial L} = \quad (20)$$

$$\frac{\tau C_w}{C_b} + R_W C_w L + R_w C_b = \sqrt{2R_w C_w \tau(1+p_b)} + \frac{\tau C_w}{C_b} + R_w C_b$$

$$\Rightarrow \lim_{L \to L_{kopt}^-} \frac{\partial D_k}{\partial L} = \frac{\partial D_k}{\partial L}(L_{kopt}) = \lim_{L \to L_{kopt}^+} \frac{\partial D_k}{\partial L}$$

Therefore, $D_k$ is both continuous and differentiable everywhere in L. Even when $R_b \neq R_{so}$, $C_b \neq C_{si}$, or $g_{so} \neq 1$, similar results can be derived under the assumption that the 2-pin net 60 is infinitely long.

Further, consider a 2-pin net 60 with the source 40 and sink 50 connected by an infinitely long wire 60 with an arbitrary number of equally spaced same-sized buffers 70. Let L, $R_0$, $C_0$, $\tau$, $p_b$, $R_w$ and $C_w$ be the parameters defined as before. Then the delay from the input of the source 40 to the input of the sink 50 under the logical effort and Elmore delay model is minimized when the number of buffers 70 inserted is $$k_{opt} = L\sqrt{\frac{R_w C_w}{2\tau(1+p_b)}},$$

and each buffer 70 is $$w_{opt} = \sqrt{\frac{\tau C_w}{R_w C_0^2}}$$

times larger than the minimum sized buffer.

Let the number of buffers 70 inserted on the net be k, k=0, 1 ..., k≧0. From (1), $$D_k = \tau\left(g_{so}\frac{C_b + C_w L_k}{C_{so}} + p_{so}\right) + \qquad (21)$$

$$k\tau\left(1 + \frac{C_k L_k}{C_b} + p_b\right) + \frac{R_w C_w L L_k}{2} + R_w C_b L_k + R_w C_{si} L_k$$

Rearranging, $$D_k = k\tau(1 + p_b) + \left(\frac{\tau C_w}{C_b} + R_w C_b\right)L\frac{k}{k+1} + \qquad (22)$$

$$\frac{R_w C_w L^2}{2}\frac{1}{k+1} + \tau\left(g_{so}\frac{C_b}{C_{so}} + p_{so}\right) + \left(\frac{\tau C_w}{C_{so}} + R_w C_{si}\right)L\frac{k}{k+1}$$

$$\frac{\partial D_k}{\partial k} = \tau(1 + p_b) + \left(\frac{\tau C_w}{C_b} + R_w C_b\right)L\frac{k}{(k+1)^2} - \qquad (23)$$

$$\frac{R_w C_w L^2}{2}\frac{1}{(k+1)^2} - \left(\frac{\tau C_w}{C_{so}} + R_w C_{si}\right)L\frac{1}{(k+1)^2}$$

For $\frac{\partial D_k}{\partial k} = 0$, $$k = \sqrt{\frac{R_w C_w L^2 + 2\left(\frac{\tau C_w}{C_{so}} + R_w C_{si}\right)L - 2\left(\frac{\tau C_w}{C_b} + R_w C_b\right)L}{2\tau(1 + p_b)}} - 1 \qquad (24)$$

$$\lim_{L\to\infty} k = L\sqrt{\frac{R_w C_w}{2\tau(1 + p_b)}} - 1 \qquad (25)$$

Since $k_{\to\infty}$ as $L_{\to\infty}$, $$\Rightarrow \lim_{L\to\infty}\frac{\partial D_k}{\partial k} = \tau(1 + p_b) - \frac{R_w C_w L^2}{2(k+1)^2} \text{ and } \lim_{L\to\infty}\frac{\partial^2 D_k}{\partial k^2} = \frac{R_w C_w L^2}{(k+1)^3} > 0 \qquad (26)$$

$k_{opt}$, the number of buffers 70 for which the delay is minimized is then given by:

$$\lim_{L\to\infty} k_{opt} = L\sqrt{\frac{R_w C_w}{2\tau(1 + p_b)}} - 1 \qquad (27)$$

The optimal inter-buffer spacing is given by:

$$\lim_{L\to\infty} L_{kopt} = \sqrt{\frac{2\tau(1 + p_b)}{R_w C_w}} \qquad (28)$$

And the optimal delay is given by:

$$\lim D_k = L\left(\sqrt{2R_w C_w \tau(1 + p_b)} + \frac{\tau C_w}{C_b} + R_w C_b\right) \qquad (29)$$

Similar to the above, since $R_0$ and $C_0$ are the driver resistance and input capacitance of a minimum size buffer, if w is the ratio of the widths of the buffer 70 used here and the minimum size buffer, $R_b = R_0/w$ and $C_b = wC_0$. The delay then is:

$$\lim_{L\to\infty} D_k = L\left(\sqrt{2R_w C_w \tau(1 + p_b)} + \frac{\tau C_w}{wC_0} + wR_w C_0\right) \qquad (30)$$

$$\Rightarrow \lim_{L\to\infty}\frac{\partial D_k}{\partial w} = -\frac{\tau C_w}{w^2 C_0} + R_w C_0 \text{ and}$$

$$\lim_{L\to\infty}\frac{\partial^2 D_k}{\partial w^2} = -\frac{\tau C_w}{2w^3 C_0} > 0$$

The optimal size of the buffer 70 is then given by:

$$\lim_{L\to\infty} w_{opt} = \sqrt{\frac{\tau C_w}{C_0^2}} \qquad (31)$$

The delay model proposed earlier can hence also be applied to nets with arbitrary sink and source under the restriction of infinite length.

From the above, one can see that Equations 16 and 17 are exact for 2-pin nets 60 with the source 40 and sink 50 connected by an infinitely long wire 60 with an arbitrary number of equally spaced same-sized buffers 60. For finite length wires 60, the estimated delay approaches the exact delay as the length approaches infinity. Also, the delay model in Equations 16 and 17 is continuous and differentiable everywhere in L for 2-pin nets with the source 40 and sink 50 connected by an infinitely long wire 60 with an arbitrary number of equally spaced same-sized buffers 70. Finally, the above can also be demonstrated using the traditional linear delay model (which models the delay through a gate as a linear function of its load) in conjunction with the Elmore delay model.

The delay model proposed in Equations (16) and (17) allows accurate prediction of wire delays in presence of long wires 60. The delay estimates account for the effect of buffering on the delay. The model is exact under some assumptions and is a good heuristic approximation for the more general cases. The delay model framework also provides results on the optimal buffering scheme for such wires 60. This enables a placement-optimization flow where the initial placement of cells can be performed without actually buffering long wires 60. Using this delay model, a timing-driven placement program can account for the wire delays without actually buffering long wires 60 (via the predictive delay formula) and an area/capacitance-driven placement program can account for capacitance shielding due to long wires 60 (via the optimal buffering distance formula). The actual delay and capacitance estimates are met later by buffering long wires 60 using the optimal buffering distance formula. This is a very powerful application of this model, since the placement changes cell locations and hence the wire lengths. Thus, adding buffers 70 explicitly at every iteration of a placement program can bias the placement algorithm, while not inserting them would yield overly pessimistic delay/capacitance estimates if traditional wire delay models are used.

From the delay model in Equations (16) and (17), the delay of long wires 60 is a function of their length and the per unit length wire resistance. Let the resistance and capacitance per unit length of a minimum width/spacing wire be $r_w$ and $c_w$ respectively. Further, let the area and lateral capacitance per unit length be $c_a$ and $c_l$ (for typical deep sub-micron technologies, $c_a \ll c_l$). Then, the resistance $R_w$ and capacitance $C_w$ per unit length of a wire with width $w_w$ and spacing $s_w$ are $R_w = r_w/w_w$ and $C_w = c_a w_w + c_l/(w_w s_w)$
Thus, $$RC_w = r_w c_a + \frac{r_w c_l}{w_w s_w} \approx \frac{r_w c_l}{w_w s_w} \qquad (32)$$

Substituting these Equations (16) and (17), the overall delay for long wires 60 is given by $$D = L\sqrt{r_w c_a + \frac{r_w c_l}{w_w s_w}} \left(\sqrt{2\tau(1+p_b)} + 2C_0\sqrt{\tau}\right) \qquad (33)$$

$$D_k = \frac{L}{\sqrt{w_w s_w}} \left(\sqrt{2\tau(1+p_b)r_w c_l} + 2C_0\sqrt{\tau r_w c_l}\right) \qquad (34)$$

From Equations (33) and (34), the wire delay can be held constant in presence of a 100% increase in wire length by doubling the width and the spacing of the wire. This observation can be used to predict and control the wire delay over a wide range of lengths during a placement-optimization flow.

From Equations (33) and (34) wire delay can be held constant in presence of length changes by changing the width and spacing of the wire. This can be used to assign wire sizes and widths and to compute delay budgets as follows: given a placement, the lengths of all wires are fixed. At this point, the wire delays are computed first using the wire length from the placement, minimum width and spacing and the library RC data. Given the cell delays and the computed wire delays, critical paths are identified. Wires on critical paths are than sized up/spaced out to reduce their delay and to bring the overall design slack to zero—this could be done by a simulated annealing algorithm as described in, e.g., Kirkpatrick et. al, "Optimization by Simulated Annealing," Science, vol. 220, no. 4598, pp. 671–680, 1983, or some greedy assignment algorithm which sizes up wires with significant delays.

The maximum allowable wire widths/sizes may be limited by technology or manufacturing constraints. Given these size and spacing assignments, wire delays are computed and stored as budgets. These delays are held constant through the flow. Subsequent wire sizings and spacings can be done on each wire individually to continue to meet these budgets in spite of any length changes (due to placement changes) and as more information like neighborhood information (during routing) is made available.

Wire delay and capacitance estimates based on placement information (e.g. Manhattan distance between pins) can be significantly different from statistical wireload models. As a result, the gate and wire delays can change significantly once placement is performed. This may change the arrival and requires times of signals in the circuit and a netlist optimized with wireload models may no longer be the optimal netlist when placement based wire models are applied. This provides a potential of re-optimizing the circuit by selectively resynthesizing parts of the network. While there are many resynthesis techniques known in the literature and resynthesis can be applied at any time, the main problem with a generic application of resynthesis is that the placement is invalidated. We propose a restructuring approach which applies the resynthesis technique similar to the ones outlined in, e.g., Singh et al., ICCAD-88, pp. 282–285, with the difference that it is applied on a placed netlist. The timing analysis is performed using the wire delay models outlined herein. Furthermore, cell location history is preserved as Boolean transformations are performed and is used to place the resulting set of cells in the same location as the cells from which they were derived. Some of these Boolean transformations involve collapsing multiple cells and reconnecting them or re-implementing them with different cells. To ensure that no new long wires are created in this process and that placement information is not changed significantly, only cells in a local placement area are resynthesized at a time.

Given a design to be placed and routed, an overall process flow may go as follows:
  calculate wire delay/buffering model parameters from library data;
  placement;
  update timing;
  restructure circuit based on wire delays;
  assign wire delays;
  buffering and wire sizing/spacing;
  incremental placement;
  resizing/respacing wires to maintain delays; and
  routing wires with desired sizing and spacing.

Preferably, the placement technique is performed as disclosed in the United States Patent Application to Savoj et al. filed on Apr. 27, 1999, U.S. patent application Ser. No. 09/300,666 incorporated herein by reference.

If there are other optimization steps, e.g., to optimize cell delays, the buffering, placement, wire sizing and spacing steps can be iterated. Preferably, this iteration includes iteration of assigned delays to account for timing changes due to the other optimization steps. Further, while the constant wire delay methodology does not perform iterations, in general one or more steps between updating timing and routing wires can be iterated. While more iterations may not always yield a better design and in fact may lead to convergence problems, one can come up with heuristic criteria for convergence to decide when to stop iterating.

Also, a crosstalk-sensitive routing program can vary size and spacing as neighboring wiring information becomes available to continue to meet the delay budgets set in the assign wire delays.

The above description of the preferred embodiment of the present invention has been given for purposes of illustration only, and the invention is not so limited. Modification and variations thereof will become readily apparent to those skilled in the art, and these too are within the scope of the invention. Thus, the present invention is limited only by the scope of the appended claims.

What is claimed is:

1. A method of buffering a long wire comprising:
  using a computer to receive an electronic representation of a circuit including a long wire, the long wire having resistance and capacitance per unit length of $R_w$ and $C_w$, respectively, and a length of L;
  using the computer to determine a number $k_{opt}$ of buffers, each buffer having an intrinsic delay of $p_b$, to be used to buffer the long wire, to be $$k_{opt} = L\sqrt{\frac{R_w C_w}{2\tau(1+p_b)}}$$

where $\tau$ is the intrinsic delay of an ideal inverter; and
  using the computer to modify the electronic representation based on $k_{opt}$.

2. A method of buffering a long wire comprising:
  using a computer to receive an electronic representation of a circuit including a long wire, the long wire having resistance and capacitance per unit length of $R_w$ and $C_w$, respectively, and a length of L;

using a computer to determine a size $w_{opt}$ of buffers to be used to buffer the long wire, to be $$w_{opt} = \sqrt{\frac{\tau C_w}{R_w C_0^2}}$$

where $\tau$ is the intrinsic delay of an ideal inverter and $C_0$ is the input capacitance of a minimum size buffer; and using the computer to modify the electronic representation based on $w_{opt}$.

3. A method of buffering a long wire comprising:

using a computer to receive an electronic representation of a circuit including a long wire, the long wire having resistance and capacitance per unit length of $R_w$ and $C_w$, respectively, and a length of L;

using the computer to determine a spacing $L_{kopt}$ between buffers to be used to buffer the long wire, each of the buffers having an intrinsic delay of $p_b$, to be $$L_{kopt} = \sqrt{\frac{2\tau(1+p_b)}{R_w C_w}}$$

where $\tau$ is the intrinsic delay of an ideal inverter; and using the computer to modify the electronic representation based on $L_{kopt}$.

4. A method of calculating delay in a long wire comprising:

using a computer to receive an electronic representation of a circuit including a long wire, the long wire having resistance and capacitance per unit length of $R_w$ and $C_w$, respectively, and a length of L; and using the computer to determine a delay $D_k$ of the long wire when a length of the long wire is less than an optimal spacing of buffers in the long wire, to be $$D_k = \tau\left(1 + \frac{C_w L}{C_b + p_b}\right) + R_b C_w L + R_w C_b L + \frac{R_w C_w L^2}{2}$$

where $R_b$ and $C_b$ are resistance and capacitance, respectively, of buffers later used to buffer the long wire; $p_b$ an intrinsic delay of the buffers; and $\tau$ the intrinsic delay of an ideal inverter.

5. The method of claim 4, wherein the-optimal spacing $L_{kopt}$ is $$L_{kopt} = \sqrt{\frac{2\tau(1+p_b)}{R_w C_w}}.$$

6. A method of calculating delay in a long wire comprising:

using a computer to receive al electronic representation of a circuit including a long wire, the long wire having resistance and capacitance per unit length of $R_w$ and $C_w$, respectively, and a length of L;

using the computer to determine a delay $D_k$ of the long wire when a length of the long wire is greater than an optimal spacing of buffers in the long wire, to be $$D_k = L\sqrt{R_w C_w}(\sqrt{2\tau(1+p_b)} + 2C_0\sqrt{\tau})$$

where $p_b$ is an intrinsic delay of the buffers and $\tau$ the intrinsic delay of an ideal inverter.

7. The method of claim 6, wherein the optimal spacing $L_{kopt}$ is $$L_{kopt} = \sqrt{\frac{2\tau(1+p_b)}{R_w C_w}}.$$

* * * * *